UNITED STATES PATENT OFFICE 2,065,241

METHOD OF TREATING PLANTS

Carl Oetling, Berlin-Steglitz, Germany

No Drawing. Application December 21, 1934, Serial No. 758,707. In Germany December 1, 1933

7 Claims. (Cl. 47—58)

My invention relates to a method of treating plants. By experiments I have ascertained that plants do not react in the same manner to the treatment with silicic anhydride and with silicates, and that through the said treatment especially such plants are furthered in their growth which do not thrive in soil containing lime.

In consideration of the fact that there are plants the growth of which is furthered by a treatment with lime and plants the growth of which is stunted by the same treatment, plants are generally subdivided into two or three groups. The three groups into which plants may be subdivided with respect to the aforesaid facts are:

Plants the growth of which is furthered by a treatment with lime,

Plants the growth of which is stunted by a treatment with lime and

Plants which thrive both in lime-containing soil and in a soil scarcely containing lime.

It is further known that there are plants which thrive better in alkaline soil and plants which prefer an acid soil and also plants which are indifferent to the acid or alkaline character of the soil. Moreover plants which prefer a lime-containing soil need not under all circumstances be averse to acidity and plants the growth of which is stunted by lime must not under all circumstances prefer acidity.

By experiments I have ascertained that the treatment with silicic anhydride or with silicates only furthers the growth of such plants which are either averse to lime or do not absolutely prefer it, whereas the growth of plants preferring lime is stunted by a treatment with silicic anhydride and with silicates.

The primary object of my invention consists now in the treatment with silicic anhydride or with silicates of such plants which are averse to a treatment with lime or do not absolutely prefer it. Another object of my invention consists in treating those plants which are averse to lime but which prefer acidity with natural silicic anhydride in a very fine distribution, whereas those plants which are averse to lime and which prefer an alkaline soil are preferably treated with silicates, e. g. with the silicates of potassium, sodium and calcium, the progress obtained by the said different treatment having been proven by experiments.

Another object of my invention consists in checking weeds which such as mosses prefer lime by treating them with silicic anhydride or with silicates, as the growth of such weeds is stunted by silicic anhydride and by silicates according to the aforesaid arguments.

Another object of my invention consists in furthering especially the synthesis of carbohydrates by a treatment with finely distributed silicic anhydride. The said synthesis goes two ways, the one way leading across the chlorophyl to form starch through synthesis and the other way leading across the cellulose to form sugar by splitting up the compound. The leaves of the so treated plants show a more distinct colour. Consequently it is advantageous to treat especially all the plants producing carbohydrates, such as fruit trees, sweet turnips, sweet potatoes and potatoes with natural active silicic anhydride or with silicates eliminating silicic anhydride by being split up in the soil.

Besides it is proven by experiments that the formation of aromatic substances is obviously furthered by treating the plants with silicic anhydride and with silicates. This effect can be probably traced back to the fact that treating the plants with these compounds favours the synthesis of carbohydrates. Undoubtedly by a treatment with finely distributed silicic anhydride and with silicates a considerable increase of the yield is attained from plants producing aromatic substances such as pinks, cumin-plants, anise-plants, tea-plants, peach-trees, quince-trees, strawberry-plants or from plants serving for the production of vegetable bitters such as hop-plants, lupine and meadow-saffron and also from plants producing odorous substances such as rose-, rosemary-, lavender- and jasmine-plants.

I have asertained that by a treatment of potato-plants with silicic anhydride and with silicates the resisting power of the said plants against infections with the potato wart is increased. In this respect the best results have been obtained by treating the plants with silicates of magnesium. Probably this is due to the fact that both by a treatment with silicic anhydride and magnesium the capability of the potato-plant to absorb lime is decreased and that a higher percentage of lime enfeebles the resisting power against infections with the potato wart.

In the case that the soil already contains compounds of magnesium in a sufficient quantity infections with the potato wart may already be obviated by a treatment with finely distributed silicic anhydride or with silicates not containing magnesium, whereas in the case that the soil already contains a sufficient quantity of silicates or of silicic anhydride infections with the potato wart may already be obviated by a treatment with finely ground manganates or other compounds of magnesium which do not contain silicium.

In all the abovementioned cases the favourable influence of the silicic anhydride is attributable to different effects arising simultaneously.

It has been ascertained by experiments that finely ground silicic anhydride probably together with secretion products of the roots transforms some kinds of artificial manure, e. g. dolomite, rough phosphate, nitrogenized calcium or Thomas phosphate, which are otherwise but slowly absorbed by the plants, in such a way that the process of absorbing the fertilizer by the roots is considerably furthered. The silicic anhydride which is met with in the tertiary formations near Cologne on the Rhine, at Lippe or at other places is especially well adapted for the last mentioned purpose.

Pure silicic anhydride may be used in a ground state, and it is advantageous to grind the substance so finely that at least 40 to 60 percent of the ground material go through a sieve with about 10,000 meshes per square cm.

In certain cases it is also advantageous to use the silicic anhydride in the amorphous or colloidal state or to use hydrates of the substance, but for economical reasons a ground natural silicic anhydride is preferred in the greater part of all cases.

It is also preferable to use the silicates in a finely ground state.

The favourable influence of the silicic anhydride for the growth of the plants is increased by an addition of salts of manganese or of iron, such as sulfates of the said elements. The said compounds of iron may be used simultaneously with the said compounds of manganese.

Example I

By means of a wheel having pegs in the periphery thereof, holes are driven into the soil having a depth of from 10 cm. to 12 cm. In these holes the seed potatoes are placed each with the required amount of silicic acid from two containers of the machine. In this way the potato surrounded with its coating of silicic acid will be protected against potato wart. The secreted colloidal silicic acid will surround the tubers and the roots and prevent lime absorption.

Example II

The treatment is carried out in the same manner as in Example I except that instead of silicic acid, potassium silicate is used. By the decomposition of the silicate a gel will be formed which will prevent lime absorption.

Example III

Natural silicic acid is so finely ground that the sieve analysis is as follows:

| Mesh per square centimeter | Unpassable |
|---|---|
|  | Percent |
| 2500 | 0.07 |
| 4900 | 0.27 |
| 6400 | 1.26 |
| 10,000 | 2.60 |

This ground product is utilized as a fertilizer.

Example IV

Experiments carried out at an official German experimental farm produced the results that for potatoes by the use of the natural active silicic acid a 1.3% higher starch content was attained, by turnips a higher sugar content of from 1.3 to 1.35% as well as a greater yield of 1540 kg. and 1060 kg. per 2500 m$^2$. The silicic acid per 2500 m$^2$. together with artificial fertilizers is utilized in amounts of 25 kg. for agriculture
125 kg. for vegetables
250 kg. for viniculture

Example V

Strawberries were fertilized with natural active silicic acid with the result that the berries were essentially sweeter and more durable due to the higher sugar content.

Example VI

By experiment, 4.5% $FeSO_4$ was mixed with $SiO_2$ to attain a suitable mixture for treating plants.

Example VII

By experiment 6,75% $MnSO_4.4H_2O$ were mixed with $SiO_2$ to attain a suitable mixture for treating plants.

Example VIII

Natural silicic acid is so finely ground that the sieve analysis is as follows:

| Mesh per square centimetre | Unpassable |
|---|---|
|  | Percent |
| 2500 | 0.08 |
| 4900 | 0.25 |
| 6400 | 1.29 |
| 10,000 | 2.65 |

This product is mixed with 2,5% $FeSO_4$ and 3,75 $MnSO_4.4H_2O$.

Strawberries were fertilized with the above described mixture. The berries were sweeter, more durable due to the higher sugar content and had a greater amount of aromatic substances.

I claim:

1. A method for treating plants which comprises subjecting the plants to natural silicic acid in such a finely ground state that at least from 40 to 60% of the ground material will pass through a sieve having a mesh of 10,000 per square centimeter.

2. A method for increasing the synthesis of carbohydrates of plants which comprises treating the living plants with finely divided natural silicic acid.

3. A method for promoting the formation of the aromatic substances in plants which comprises treating the plants with a finely divided natural silicic acid.

4. A method for treating plants which comprises subjecting the plants with finely ground silicic acid from the tertiary.

5. A method for treating plants with a mixture which consists in subjecting the plants to the mixture comprising finely divided silicic anhydride and salts of manganese.

6. A method for treating plants with a mixture which consists in subjecting the plants to the mixture comprising finely divided silicic anhydride and iron salts.

7. A method for treating plants with a mixture which consists in subjecting the plants to the mixture comprising finely divided silicic anhydride, manganese salts and iron salts.

CARL OETLING.